United States Patent [19]
Artin et al.

[11] Patent Number: 5,000,578
[45] Date of Patent: Mar. 19, 1991

[54] FOOD MIXING APPLIANCE

[75] Inventors: Robert L. Artin, Richfield; Mark A. Kubale, West Bend, both of Wis.

[73] Assignee: Sunbeam Corporation, Downers Grove, Ill.

[21] Appl. No.: 487,681

[22] Filed: Mar. 2, 1990

[51] Int. Cl.$^5$ .............................................. B01F 7/24
[52] U.S. Cl. ..................................... 366/297; 366/100; 366/331
[58] Field of Search ............... 366/331, 320, 297, 298, 366/299, 601, 300, 301, 69, 96, 97, 100, 206, 241, 261, 279

[56] References Cited

U.S. PATENT DOCUMENTS

| | | | |
|---|---|---|---|
| 2,061,868 | 11/1936 | Fitzgerald | 366/201 |
| 2,069,506 | 2/1937 | Ross | 366/201 |
| 2,169,014 | 8/1939 | Aalborg | 366/206 |
| 2,323,945 | 7/1943 | Strauss | 366/200 |
| 2,329,640 | 9/1943 | Moeller | 366/331 |
| 2,616,673 | 11/1952 | Guilder | 366/197 |
| 2,616,732 | 11/1952 | Schwaneke | 366/197 |
| 2,857,533 | 10/1958 | Miller | 366/200 |
| 3,951,351 | 4/1976 | Ernster | 366/200 |
| 4,176,971 | 12/1979 | Ernster | 366/69 |
| 4,277,181 | 7/1981 | Stahly | 366/98 |

Primary Examiner—Robert W. Jenkins
Attorney, Agent, or Firm—Neil M. Rose

[57] ABSTRACT

A food mixing appliance having two sets of rotatable spindles, each set detachably receiving a pair of mixing implements which are retained by a manually operable retainer slidably movable in two directions to permit sequential insertion and retention of both implements in either pair. The appliance further including a detachable connection between a mixing head and a support column including an axle having a cutaway portion separating two journal portions, which axle is engaged by parallel spaced walls and a retaining wall extending from one of such spaced walls a distance equal to said cutaway portion.

21 Claims, 5 Drawing Sheets

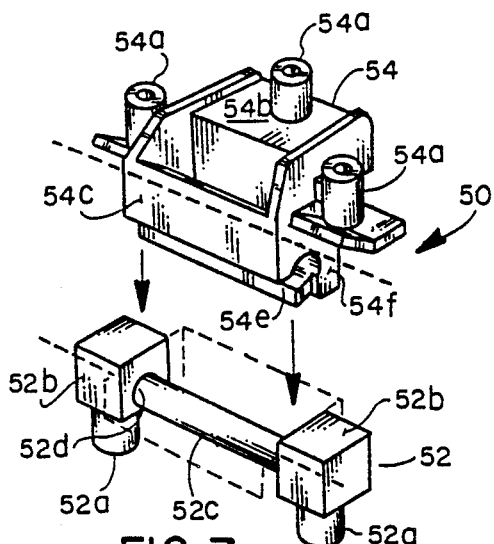
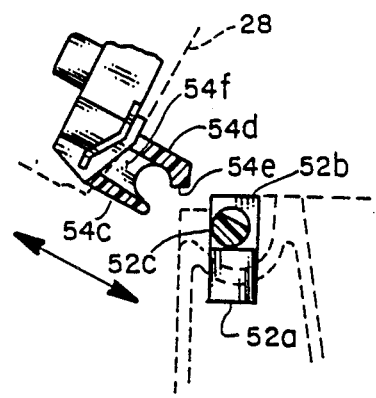
FIG. 7  FIG. 8
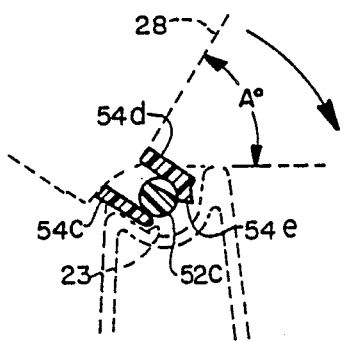
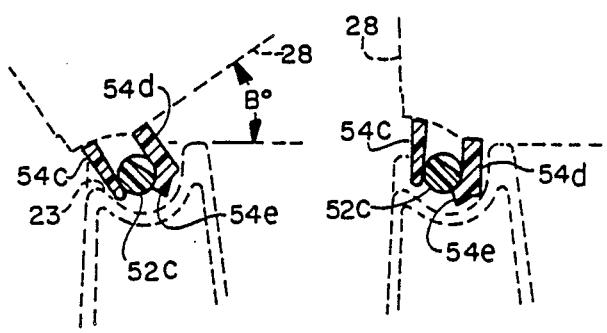
FIG. 9  FIG. 10  FIG. 11
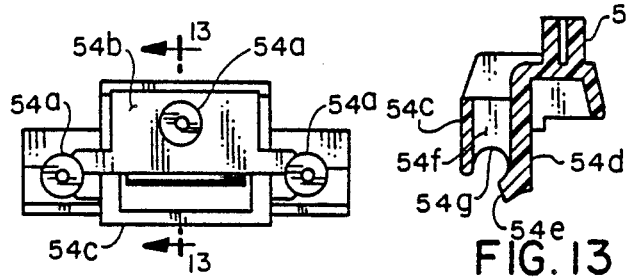
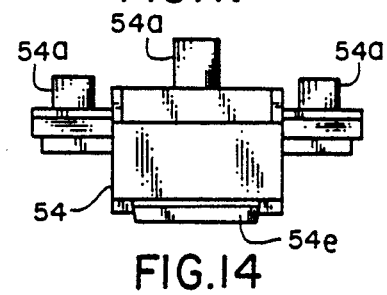
FIG. 12  FIG. 13  FIG. 14
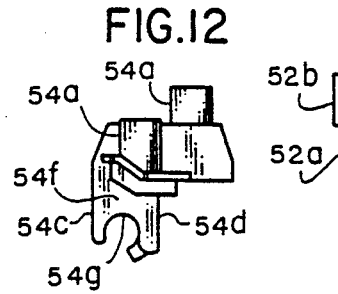
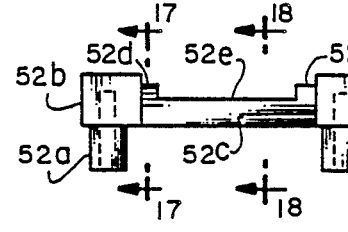
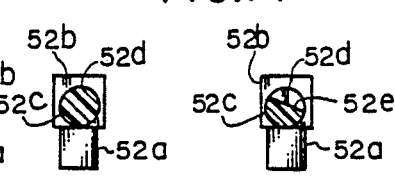
FIG. 15  FIG. 16  FIG. 17  FIG. 18

FOOD MIXING APPLIANCE

BACKGROUND OF THE INVENTION

The present invention relates generally to food mixing appliances for domestic use and more specifically to a multipurpose electric food mixer having multiple spindles for receiving different types of food mixing implements which rotate at various speeds.

The invention relates to multipurpose kitchen appliances of the type disclosed and claimed in the U.S. Pat. Nos. to Ernster, et al. 3,951,351 and Ernster, et al. 4,176,971.

In the multipurpose kitchen appliance of the type with which the invention is concerned there is typically provided a stand including a base and column portion which supports a detachable head at the top of the column. The head extends transversely across the base and laterally of the column so as to have a portion positioned above a turntable on the base which receives a food vessel. Various types of implements may be mounted in the head overhanging the vessel to permit one to mix and blend food ingredients in the vessel. The head is equipped with driven spindles which rotate about vertical axes and which detachably receive either food beaters or dough hooks. The spindles for use in connection with the dough hooks are driven at a relatively slower speed than the spindles which receive the beaters. Typically, the dough hooks require greater power and should be rotated more slowly to properly knead the ingredients for making bread. Because of the different speed and power requirements for the two types of food mixing implements, the head is arranged with two pairs of spindles, one of which rotates at the slower speed with greater power, and the other of which operates at the higher speed.

As described in the above cited Ernster, et al. U.S. Pat. Nos., the mixing head in such multipurpose kitchen appliances is typically mounted on the column portion of the stand in a manner so that it may be unlatched and moved from its horizontal operating position to an inclined position in which the food mixing implements are withdrawn from the food receiving vessel and disengaged from the food. This permits the user to add ingredients or perform other functions in connection with the bowl ingredients on the stand turntable or to remove the bowl from the turntable if the mixing has been completed. In addition, the mixing head must be removable or detachable from the stand so that alternative functions may be performed. As shown and described in the Ernster, et al. U.S. Pat. No. 3,951,351, the mixing head may be replaced by a blender which is adapted to be driven by the same motor which may alternatively drive the mixing head. Accordingly, it is important that means be provided to facilitate easy removal of the mixing head and permit it to be readily reassembled to the stand when needed. In the Ernster, et al. U.S. Pat. No. 3,951,351, a rotatable latch member was provided to detachably secure the mixing head to a bearing support which supports the mixing head for rotatable movement with respect to the stand.

There are many examples in the prior art of stand supported food mixers which are generally similar to the multipurpose kitchen appliances described earlier and which have mixing heads which are supported for pivotal movement with respect to their stands and at the same time are readily removable therefrom. Such stand mixers differ from the multipurpose kitchen appliances in that the motor which drives the food mixing implements is positioned in the mixer head, whereas, in the multipurpose kitchen appliance the motor is positioned in the column portion of the base so that it may drive other attachments in addition to the mixing head, such as, for example, a blender or slicing and shredding attachment. Some of the relevant U.S. prior art Pat. Nos. with respect to the detachable support of a mixing head comprise to Miller U.S. Pat. No. 2,857,533; Strauss, et al. U.S. Pat. No. 2,323,945; Fitzgerald U.S. Pat. No. 2,061,868; the U.S. Pat. No. to Aalborg 2,169,014; Kochner U.S. Pat. No. 2,179,245; and Ross U.S. Pat. No. 2,069,506.

The head latching and retention means disclosed in the Ernster et al. U.S. Pat. No. 4,176,971 and the one disclosed in the Ernster et al. U.S. Pat. No. 3,951,351 are structurally complicated and are difficult to operate, requiring more than one hand to accomplish the removal of the mixing head. However, because of the power requirements in mixing or kneading dough, it is important that the mixing head be retained securely on the top of the stand column as well as being easy to remove therefrom.

The problem of retention and release of the food mixing implements in the multipurpose kitchen appliance is somewhat different from that faced in the convention mixer since, instead of having the capacity to retain two beaters, it must have the capacity to retain and release four food mixing implements, i.e., two beaters and two dough hooks. The U.S. Pat. Nos. to Ernster, et al. 3,951,351 and Ernster, et al. 4,176,971 disclose various types of beater ejector and retention mechanisms. Both include spring retention rings on each of the food mixing implements and independent means for applying forces to the upper ends of the implements to dislodge the spring retention means and release the implements from their assembled relationship to the driving spindles. It has been found that the resilient C-ring type beater retention means shown in the '971 and '351 Ernster, et al. U.S. Pat. Nos. is not entirely satisfactory since it provides a less than positive retention of the food mixing implements and provides an increased risk of the implements being dislodged during the mixing operation. Accordingly, it is preferable to retain the beaters in assembled position in the spindle by having a more positive latch engagement. Some of the prior art patents, including the Moeller U.S. Pat. No. 2,329,640 and Schwaneke U.S. Pat. No. 2,616,732, disclose such retention means. However, the problem of providing a simple and positive latching means for all of the four spindles in a multipurpose kitchen appliance has not yet been resolved satisfactorily.

BRIEF DESCRIPTION OF THE INVENTION

The invention comprises a multipurpose kitchen appliance having a mixing head with four food implement receiving driven spindles which have an improved and simplified implement retention means associated with the spindles. The implement retention means includes a plate which supports for slidable movement in the horizontal plane a retainer which is mounted thereon for limited sliding and rotational movement and is provided with four latch portions which engage recessed areas in the top of each one of the mixing implements associated with the various spindles. Biasing means which takes the form of a pair of S-shaped springs formed integrally with the plastic retainer urge the retainer in a direction to engage and lock the food implements against attachment downwardly from the spindles. A simple manually operated lever is provided to deflect the retainer to the position in which it releases the food mixing implements.

The invention further comprises a novel means for pivotally interconnecting and detachably connecting the mixing head to the column portion of the stand. This support means includes an axle associated with the top of the column portion of the stand, which axle has a pair of bearing portions at either end of the axle spaced by a portion of the axle which has a segment cutaway. The mixing head is formed with support means including a pair of spaced walls which straddle and grip the axle and which are interconnected at their opposite ends with wall portions having semicylindrical recesses forming journal portions for engagement with the bearing portions of the axle. The head support means is further formed with a latching wall which extends outwardly from one of the spaced walls having a cylindrical curvature corresponding to the journal portions and being spaced from the opposite wall an amount equal to the thickness of the axle at the area of the cutaway. This arrangement provides a simple and structurally improved means for pivotally interconnecting the mixing head to the column portion of the stand, while at the same time, permitting the easy detachment of the mixing head from the stand.

A further aspect of the invention comprises a latch mechanism which may be easily operated with one hand and which alternatively locks the mixing head in its operating position or supports the mixing head in a raised position in which the mixing implements would be elevated out of the ingredient receiving bowl. The latch mechanism includes a simple molded plastic slide which cooperates with a front latch and a cam operated head support to accomplish the described functions.

Accordingly, it is an object of the present invention provide an improved multipurpose kitchen appliance which has a simple and effective mixing implement retainer which operates on all four of the driving spindles.

It is a further object of the present invention to provide an improved beater retention means for a food mixer having four spindles and being capable of receiving and retaining the mixing implements one at a time.

It is another object of the present invention to provide a food implement retainer for a food mixer having four implement receiving spindles by providing means for mounting a one-piece plastic retainer for limited universal movement with respect to the spindles in a horizontal plane, having integrally formed biasing means urging the retainer to an implement engaging position.

It is another object of the present invention to provide an improved mixing head support means for a multipurpose kitchen appliance.

It is another object of the present invention to provide pivotal support means for a mixing head associated with a multipurpose kitchen appliance which has improved bearing means and simplified means for disengaging the mixer head from its support stand.

Another object of the present invention is to provide an improved mixing apparatus including a base pivotally supporting a mixing head with an improved latch mechanism for locking the head in an operative position or supporting the head in an inoperative position.

Further objects and advantages will become apparent as the following description proceeds, and the features of novelty which characterize the invention will be pointed out in the claims annexed to and forming a part of the specification.

BRIEF DESCRIPTION OF THE DRAWINGS

FIG. 7 is an exploded perspective view of the mixing head assembly means which interconnects the mixing head to the column portion of the stand;

FIG. 8 is a side elevational view of the head assembly means of FIG. 7 showing portions thereof in section;

FIGS. 9, 10 and 11 are schematic illustrations of the interengaging portions of the head assembly means with the parts in the assembly position in FIG. 9, in the raised head position in FIG. 10, and in the operating position in FIG. 11;

FIG. 12 is a top plan view of the head support portion of the head assembly means;

FIG. 13 is a sectional view taken on line 13—13 of FIG. 12;

FIG. 14 is a rear elevational view of the head support means of FIG. 12;

FIG. 15 is a side elevational view of the head support means of FIG. 12;

FIG. 16 is a rear elevational view of the axle portion of the head assembly means;

FIG. 17 is a sectional view taken on line 17—17 of FIG. 16;

FIG. 18 is a sectional view taken on line 18—18 of FIG. 16.

Referring to FIGS. 1 and 2 of the drawings, there is shown a multipurpose kitchen appliance designated generally by reference numeral 20. The appliance 20 includes a stand 22 which is made up of a base 22a and a column portion 22b. The base 22a includes a portion from which the column portion 22b extends upwardly and a portion extending laterally of the column portion 22b to support a turntable on which a food receiving bowl or vessel would conventionally be positioned. The turntable and bowl form no part of the present invention, and are not, therefore, shown. The base 22a is supported by a plurality of feet 22c to support the appliance 20 on a kitchen counter top or the like.

Figure 1:
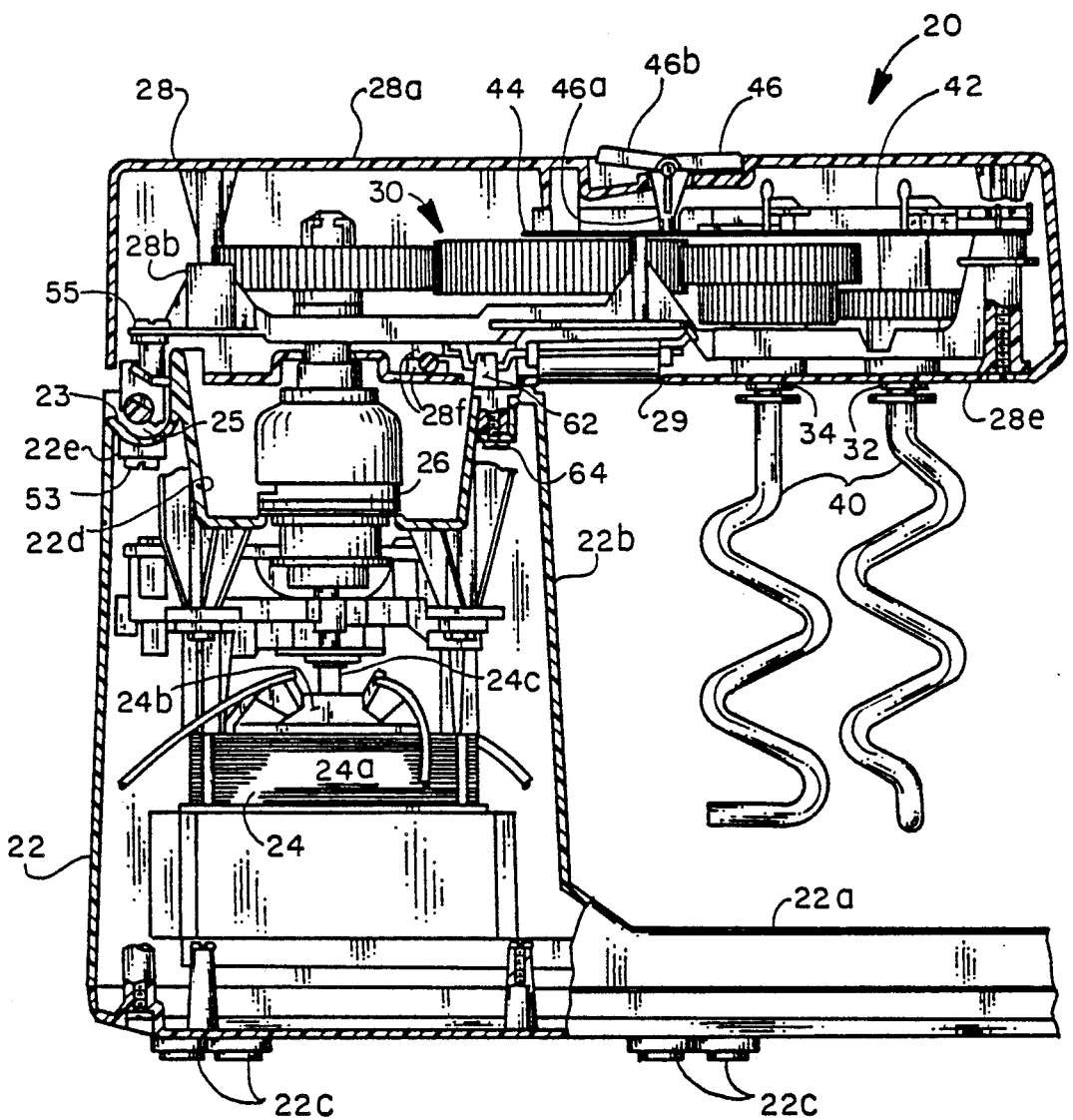
FIG. 1 is a side view of a multipurpose kitchen appliance comprising our invention with the appliance housing cut away to reveal the internal mechanism and with the appliance shown with the dough hooks as the food mixing implements.

Within the column portion 22b of the stand 22 there is mounted an electric motor 24 which includes a field 24a, an armature 24b, and an output armature shaft 24c. On the exterior of the stand 22 and within a recess 22d at the top of the column portion 22b there is an output drive coupling 26 which is mounted on the upper end of the armature shaft 24c. Supported on the top of the column portion 22b of the stand 22 is a mixing head 28. The mixing head 28 includes a head housing 28a and a support frame 28b on which is mounted a gear train 30. The gear train 30 may correspond generally to the gear train disclosed in the Ernster et al. U.S. Pat. No. 4,176,971 and includes four output spindles 32, 34, 36 and 38. Each of the spindles 32, 34, 36 and 38 are formed with central bores which are adapted to receive food mixing implements and to rotate about their vertical axes. As is discussed in greater detail in the Ernster, et al. U.S. Pat. No. 4,176,971, one pair of spindles, in this case, spindles 32 and 34, are rotatable at a slower speed than the spindles 36 and 38. The spindles 32 and 34 are designed to receive food mixing implements 40 which, as shown in FIG. 1, comprise dough hooks specifically designed to knead the ingredients for making bread dough. The other pair of spindles 36 and 38 are adapted to receive conventional food mixing beaters of the type shown in Ernster et al. U.S. Pat. No. 3,951,351 and rotate at a relatively faster speed than the spindles 32 and 34.

Figure 19:
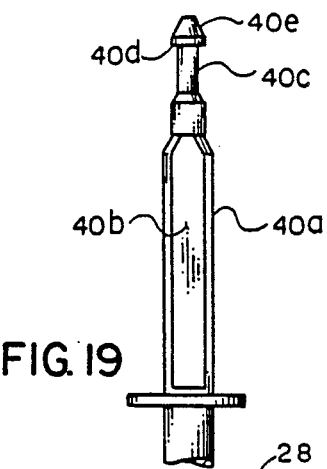
FIG. 19 is an enlarged fragmentary view of the upper end of one of the food mixing implements.

The upper ends of each of the food mixing implements 40 include a shank portion 40a, as shown in FIG. 19, which is received in the bore of the spindles 32 or 34. Each of the implements 40 has a different configuration from each of the others and each shank portion includes either flatted surfaces or projections which cooperate with one of the respective spindle bores to key or lock the implement into driving engagement with the respective spindle. By having each implement shank portion 40a adapted to fit into only one of the spindles 32, 34, 36 or 38, the user is assured of having the dough hooks or the beaters inserted into the appropriate spindles. The implement 40 shown in FIG. 19 has a pair of flatted edges 40b which mate with corresponding flatted portions in one of the spindle bores to permit the spindle to drive the food mixing implement 40. The upper ends of the mixing implements 40 are formed with recess portions 40c and downwardly facing annular shoulders 40d for a purpose to be described more fully below. Above the annular shoulder 40d the mixing implements 40 are formed with conical cam portions 40e.

Figure 2:
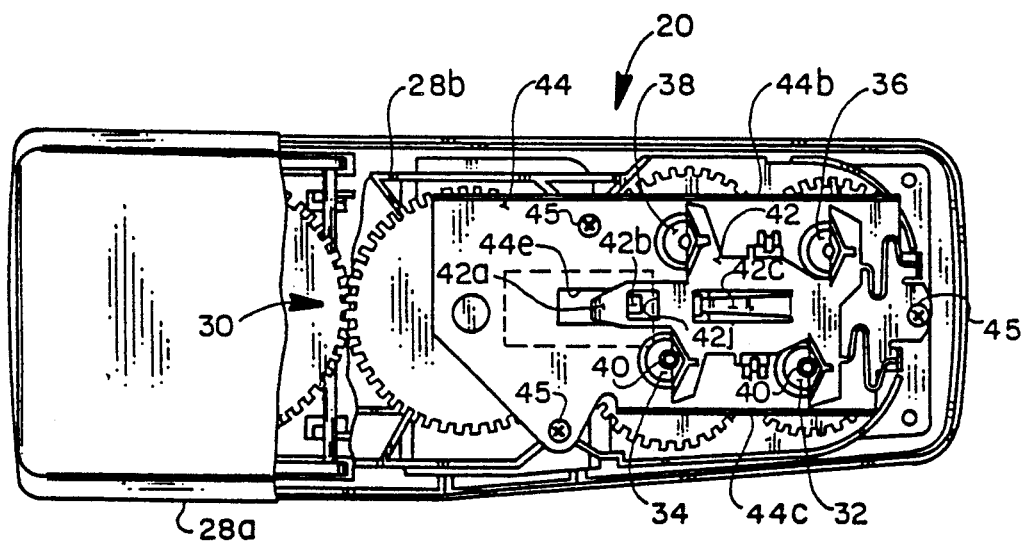
FIG. 2 is a top plan view of the mixing head portion of the appliance of FIG. 1 with a portion of the housing cut away to expose the internal components of the appliance.
Figure 3:
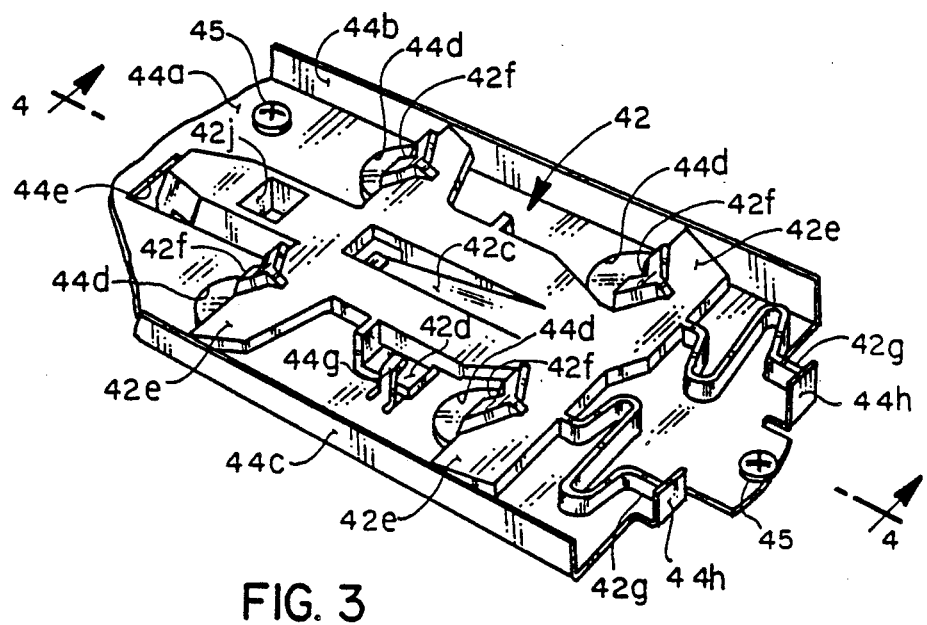
FIG. 3 is an enlarged perspective view of an assembly including the implement retainer mounted on its support plate.
Figure 4:
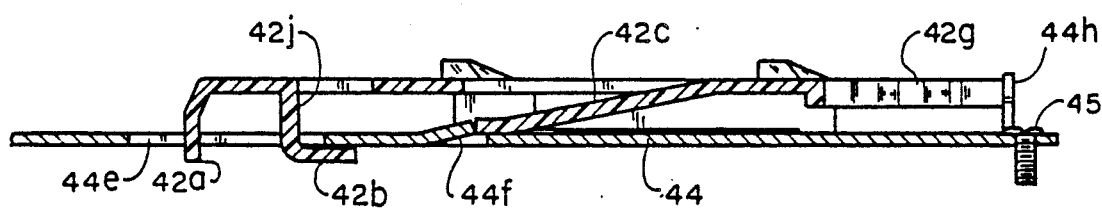
FIG. 4 is an enlarged cross sectional view taken on line 4—4 of FIG. 3.

In order to retain the food mixing implements 40 in the respective spindles 32, 34, 36 and 38, there is provided a retainer 42 shown best in FIGS. 3, 4, 5 and 6. The retainer 42 is supported for movement in the horizontal plane by means of a plate 44 which is shown in FIGS. 2, 3 and 4. The plate 44 has a generally horizontal body portion 44a along the edges of which are positioned upwardly extending walls or flanges 44b and 44c. The plate 44 is formed with four central openings 44d through which the upper portions of the spindles 32, 34, 36 and 38 extend and through which the top ends of the food mixing implements 40, extend. The retainer 42 and the plate 44 are provided with various openings, projections and tabs which permit the retainer 42 to have limited horizontal movement in a direction lengthwise of the walls 44b and 44c and limited rotational movement. The left end of the retainer 42, as seen in FIG. 4, has a downwardly projecting tab 42a which is received within an opening 44e in the plate 44 to limit the sliding and rotational movement of the retainer 42. The integrally molded tab 42b on the retainer 42 extends through the opening 44e into engagement with the lower face of the plate 44 and maintains the retainer 42 in assembled relation to the plate 44, limiting its movement upwardly from the plate 44.

To prevent the retainer from sliding to the left, as shown in FIG. 4, a sufficient extent to disengage the tab 42b from the underside of the plate 44, there is provided an integrally molded leg 42c which engages a punched tab 44f on the plate 44. In order to disassemble the retainer 42 from the plate 44, it is necessary only to lift the end of the leg 42c to disengage it from the tab 44f, allowing the retainer to move to the left and disengage the tab 42b from the underside of the plate 44. The plate 44 is also provided with L-shaped tabs 44g, one of which is shown in FIG. 3, which engage pads 42d on the retainer 42 to further limit movement of the retainer upwardly from the plate 44. The tabs 44g are spaced apart sufficiently to allow some transverse movement of the retainer 42 in a direction normal to the direction in which the walls 44b and 44c extend.

Figure 5:
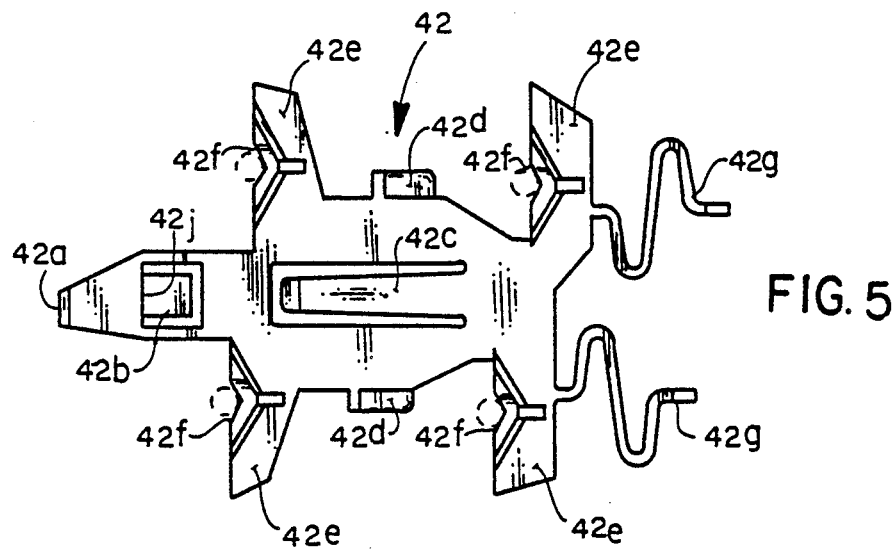
FIG. 5 is a top plan view of the food mixing implement retainer.
Figure 6:
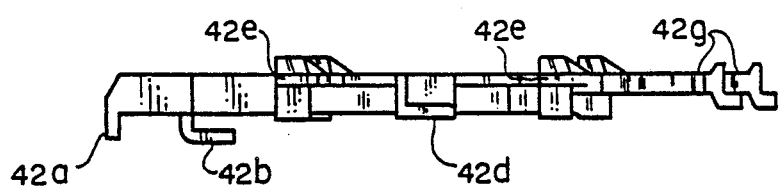
FIG. 6 is a side elevational view of the food mixing implement retainer.

As viewed from above, as in FIG. 5, the retainer 42 has a somewhat spider-shaped form having four outwardly extending legs 42e which are positioned to engage the upper ends of the food mixing implements 40. The legs 42e are formed at their left edges, as viewed in FIG. 5, with V-shaped latch portions 42f which are adapted to engage beneath the shoulders 40d into the recesses 40c formed in the food mixing implements 40. In order to urge the retainer into a position in which the latch portions 42f engage and retain the food mixing implements, the retainer 42 is formed with S-shaped projections 42g which are resilient and are compressed against a pair of support tabs 44h on the plate 44. The spring-like projections 42g are positioned to exert their forces in a horizontal plane and in a direction which lies in the vertical plane determined by the adjacent pair of food mixing implements. Thus, the one spring 42g would apply its force along a direction corresponding to the vertical plane determined by the axes of the spindles 32 and 34, while the other spring 42g would exert a force generally in the vertical plane determined by the axes of the spindles 36 and 38.

As best shown in FIGS. 1 and 2, the plate 44 is secured to the support frame 28b by screws 45. In order to force the retainer 42 to the right from the position shown in FIG. 1 in engagement with the upper ends of the mixing implements 40, a T-shaped actuator 46 is mounted on the housing 28a with a downwardly projecting leg 46a extending into an opening 42j in the retainer 42. The actuator 46 has a button portion 46b which in its normal position extends slightly above the top wall of the head housing 28. When the actuator 46 is rotated by depressing the button portion 46b, as shown in FIG. 1, the leg 46a engages the retainer 42, causing it to move to the right and disengage from the food mixing implements 40, allowing them to drop by gravity from their positions assembled to any of the spindles 32, 34, 36 and 38.

One of the main advantages of the above described retainer, in addition to its simplicity, is the fact that it controls all four of the food mixing implements assembled to any of the four spindles 32, 34, 36 and 38. It is also advantageous in that it is possible to insert the food mixing implements into their spindles one at a time without having the second inserted implement dislodge the previously assembled implement. Thus, when one of the dough hooks has been assembled to spindle 32, it has by the action of the top cam portion 40e on the of the implement 40, caused the retainer 42 to deflect to the right and allow the latch portion 42f to move into the recess 40c where it engages the shoulder 40d and prevents the implement 40 from being removed. When the second dough hook is inserted into the spindle 34, the retainer 42 is again cammed to the right of the action of the conical portion 40e. However, the force as exerted by the springs 42g cause the retainer 42 to pivot sufficiently that it continues to engage and retain the shank received in the first spindle 32. Similarly, the mixing beaters to be inserted in spindles 36 and 38 may be inserted successively without dislodging the first assembled one.

In order to assemble the head 28 to the stand 22 and accommodate pivotal movement between the head 28 and the stand 22 while so assembled, there is provided a head assembly means designated generally as 50 and including an axle assembly 52 carried by the stand and a head support means 54 carried by the mixing head. The axle assembly 52 is secured to the stand housing by means of screws 53 which extend upwardly through a support means 22e in stand 22 into the bosses 52a shown in FIG. 7. The bosses 52a extend downwardly from support blocks 52b positioned at either end of an axle 52c. The axle 52c is formed with bearing portions 52d at either end thereof and with a cutout portion 52e located therebetween, as best shown in FIGS. 16, 17 and 18. The cutout 52e represents a segment cutaway along a plane which is parallel to the axis of axle 52c, as shown best in the sectional view of FIG. 18.

Cooperating with the axle assembly 52 is the head support means 54 which is secured to the support frame 28b in the head 28 by self-tapping screws 55 one of which is shown in FIG. 1. The screws 55 are received in openings in bosses 54a. The head support means 54 includes a body portion 54b from which there extends a pair of spaced parallel walls 54c and 54d which are spaced apart a distance which is substantially equal to the diameter of the axle 52c and specifically the bearing portions 52d. At the lower end of the wall 54d there is a curved retaining wall 54e which forms a segment of a cylinder having a diameter corresponding to that of the axle 52c. The head support means 54 is further formed with a pair of end walls 54f, as shown in FIGS. 8 and 13, which end walls are formed with journal portions comprising downwardly facing recesses 54g, each of which is semi-cylindrical in shape and having an axis which is coincident with the axis of the other recess 54g formed in the corresponding wall 54f. Although not entirely evident from the drawings, it must be appreciated that the length of the wall 54e corresponds to the length of the cutaway or flattened portion 52e while the semi-cylindrical recesses 54g correspond in axial dimension to the bearing portions 52d on the axle 52c. Thus, there are two distinct portions of the head assembly means which perform separate and different functions. The central portion including the wall 54e retains the head 28 assembled to the stand 22 through a range of pivotal movements while the end portions of the axle 52c with the bearing portions 52d cooperate with the recesses 54g to support the pivotal movement of the head with respect to the stand.

Turning to FIGS. 8 through 11, the positions occupied by the head assembly means 50 in the various positions of the mixing head 28 are illustrated. First, in FIG. 8 the head 28 is shown as being moved into engagement with the stand. The mixing head 28 is angled upwardly at an angle of approximately 60° (shown as angle A in FIG. 9) to permit the narrow dimension of the axle 52c to be inserted into the opening between the wall 54e and the wall 54c. Once the head support means 54 has been moved to the position shown in FIG. 9, the mixing head 28 may be rotated causing the wall 54e to move into retaining engagement with the part of the axle 52c adjacent to the cutaway portion 52e. As shown in FIG. 10, the mixing head 28 is in its normal latched up position at an angle of 30° (shown as angle B in FIG. 9) in which position the mixing implements would be withdrawn from the food containing vessel, whether to add ingredients or to remove the vessel from the turntable. In FIG. 11, the mixing head is in its normal operating position in which the food mixing implements would be fully engaged with the vessel containing the food. Thus, it may be seen that in the normal operating range of pivotal movement of the head 28 between the operating position in FIG. 11 and the raised position shown in FIG. 10 the various walls 54c, 54d and 54e on the head support means as well as the end bearing walls 54f engage the axle 52c over a wide area to provide a rigid connection while still permitting easy pivoting of the head with respect to the stand. In addition, by moving the head to the limits of its counterclockwise rotation as shown in FIG. 9, the head 28 may be easily and simply detached from the stand using one hand and without the necessity of activating a separate latch as is common in the prior art. This limit of counterclockwise rotation is determined by a wall 23 defining part of a recess 25 formed in the top of column 22b, as best shown in FIG. 1. The axle assembly 52 is mounted within the recess 25.

The present invention includes an improved head support latch as compared to the head support latch disclosed in the patent to Ernster, et al. U.S. Pat. No. 3,951,351. The present invention involves a head support latch which supports the mixing head in the angled position shown at FIG. 10 of the drawings and also serves to latch the mixing head in the lowermost position as shown in FIG. 11. In the operative position as shown in FIG. 11, it is important to have the mixing head latched in the operative position since there are large forces associated with certain mixing operations and particularly with the kneading of bread dough. Without a latch to hold the mixing head in the lowered position, the mixing head tends to pivot upwardly around the axle 52c and the mixing head becomes much less effective in performing its function. It is important that the latch be disposed in a convenient location so that the latch may be operated to release the mixing head from its downwardly locked position and pivoted upwardly with one hand and in a simple manner. It is also important that the head support latch be easily operated to move the mixing head from its elevated position to its operative position, using only one hand and a simple movement.

Figure 20:
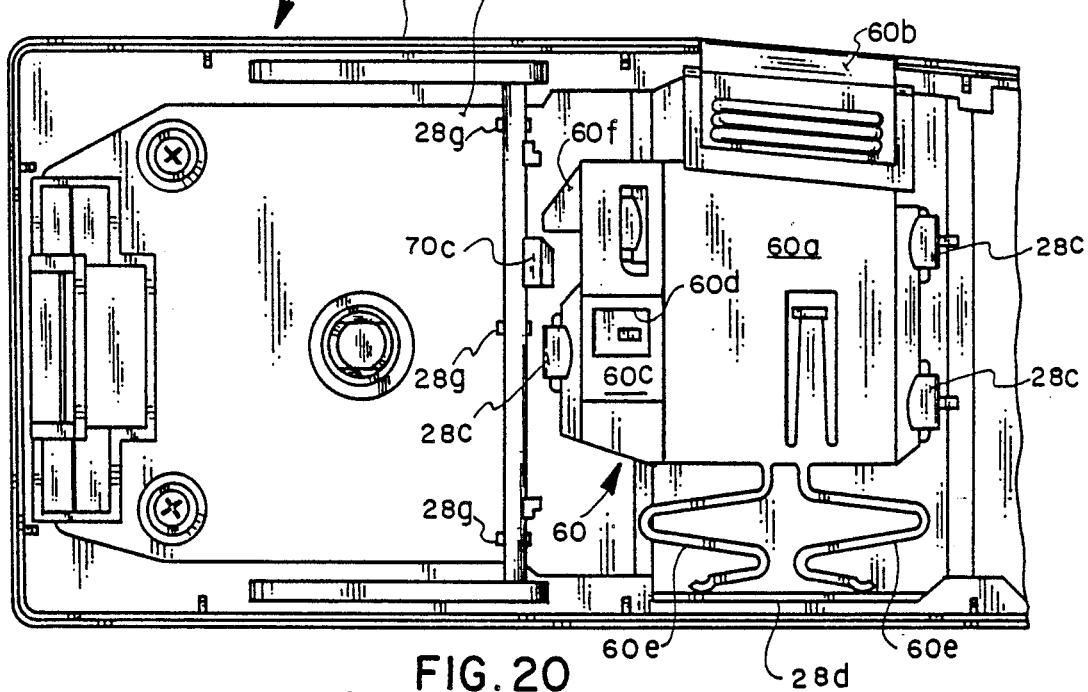
FIG. 20 is a partial bottom plan view of the mixing head with the cover portion for the mixing head housing removed to expose the latch mechanism.
Figure 23:
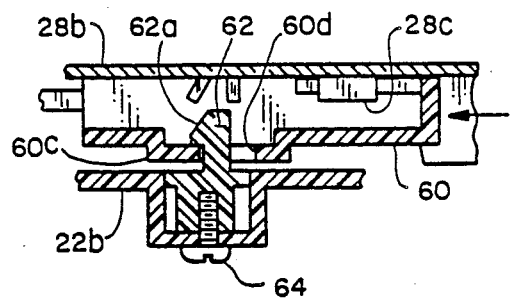
FIG. 23 is an enlarged fragmentary sectional view of the front latch taken on line 23—23 of FIG. 22.
Figure 24:
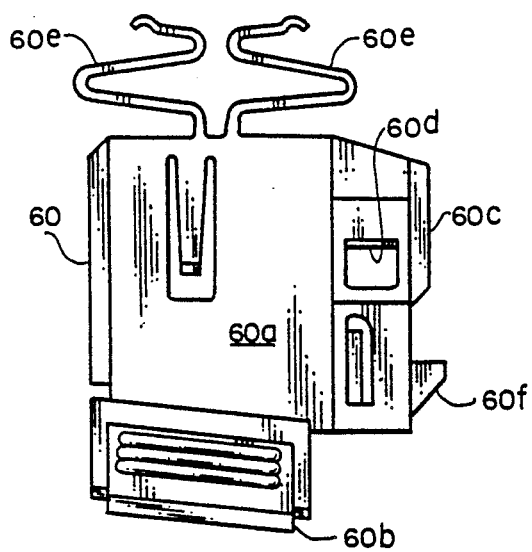
FIG. 24 is a top plan view of the latch release plate which forms part of the front latch.

Referring to the drawings, there is shown in FIG. 24 a latch release plate 60 which is supported for horizontal sliding movement on the bottom of the support frame 28b of the mixing head 28. The support frame 28b has a number of L-shaped tabs 28c which guide the latch release plate 60 for limited rectilinear movement in a horizontal plane in a direction transverse to the length of the mixing head 28, or vertically, as shown in FIG. 20 of the drawings. The latch release plate 60 includes a central body portion 60a, a manual button or actuator 60b and a hold down latch portion 60c. The hold down latch portion 60c includes an opening 60d which is adapted to receive a hook-shaped member 62 as is best shown in FIG. 23. The hook-shaped member 62 is mounted in the top of the column 22b by a screw 64 as is best shown in FIGS. 1 and 23.

In order to bias the latch release plate 60 to its uppermost position as seen in FIG. 20, there are provided flexible, integrally molded S-shaped spring portions 60e. The spring portions 60e engage at their lower ends, as shown in FIG. 20, a wall portion 28d formed on the support frame 28b. In the mounted position of the latch release plate 60 on the support frame 28b, the spring portions 60e are slightly compressed to urge the latch release plate 60 to the limit of its possible movement in the upward position as shown in FIG. 20. The manual actuator 60b is disposed and extends through an opening 29 in the mixer head housing 28a so that it may be manually operated to displace the latch release plate downwardly as shown in FIG. 20, (or to the left as shown in FIG. 23) compressing the spring portion 60e and disengaging the hook-shaped member 62 from the latch portion 60c.

For the purpose of supporting the mixing head in the angled position as shown in FIG. 10 of the drawings, there is provided a mixer head support lever 70 which includes spaced support sectors 70a which are interconnected by a bar 70b. The bar 70b includes a cam 70c and stop members 70d. The bar 70b of the mixer head support lever 70 is mounted for rotary movement about its axis between the support frame 28b and a housing cover portion 28e which forms a closure for the lower portion of the mixer head housing 28a. The cover portion 28d is formed with upwardly extending projections 28f which have upwardly facing semicylindrical recesses adapted to receive the bar 70b. There are three of such projections which serve to journal the bar 70b, as shwon in FIG. 20. The support frame 28b is formed with three spaced apart downwardly extending walls 28g (one of which is shown in FIG. 1) which maintain the bar 70b in the recesses in the projections 28f, thus journaling the bar 70b for rotation about its axis. The 28d to limit rotation of the bar 70b and the entire head support lever 70 to an angle of approximately 60°.

Figure 21:
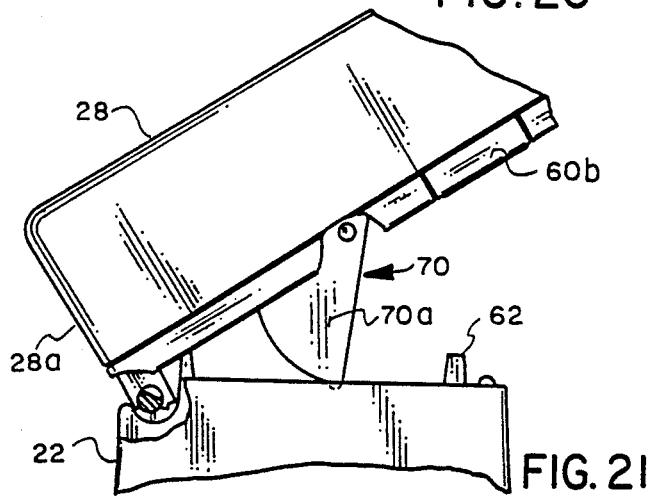
FIG. 21 is a fragmentary schematic side elevational view of a portion of the mixing head and column portion of the stand showing the head in its raised or inoperative position.
Figure 28:
FIG. 28 is a partial sectional view taken on line 28—28 of FIG. 26.
Figure 29:
FIG. 29 is a fragmentary view of the head support lever taken on line 29—29 of FIG. 26.
Figure 22:
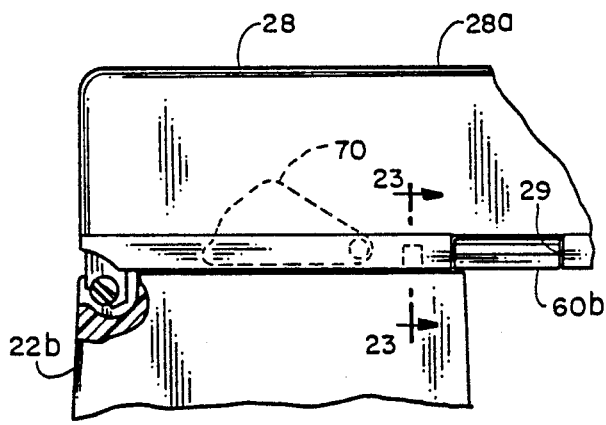
FIG. 22 is a fragmentary schematic view similar to FIG. 21 but showing the mixing head in its latched down and operative position.

When the mixing head 28 is raised from its latched down or horizontal position to the elevated position shown in FIGS. 10 and 21, the mixer head support lever 70 pivots counterclockwise under the influence of gravity until it arrives at the limits of its counterclockwise movement as shown in FIG. 21. In this position, the support sectors 70a engage the top of the column portion 22b to support the mixing head 28 in its inoperative or withdrawn position, as shown in FIG. 21.

Figure 25:
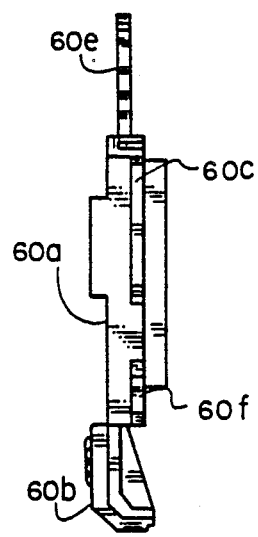
FIG. 25 is a side view of the latch release plate of FIG. 24.
Figure 27:
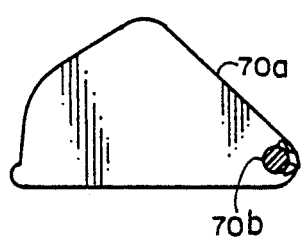
FIG. 27 is a sectional view taken on line 27—27 of FIG. 26.
Figure 26:
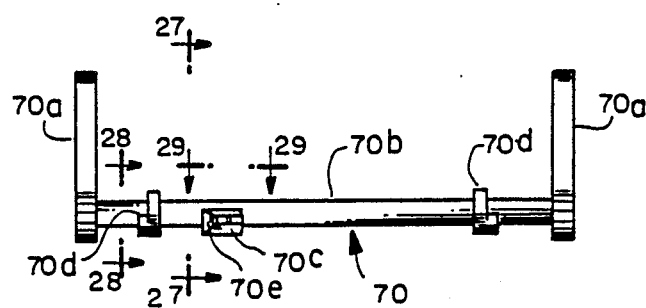
FIG. 26 is an elevational view of the head support lever.

When it is desired to move the mixing head to the operative or latched down position, the manual actuator 60b is pressed inwardly or transversely with respect to the mixing head 28. As this movement takes place, a latch release projection 60f, shown best in FIGS. 24 and 25, engages the cam 70c which has an angled face 70e, the engagement of which with the latch release 60f causes the support lever 70 to rotate clockwise, as shown in FIG. 21, thereby disengaging the support sectors 70a from the top of the support column portion 22b and permitting the mixing head 28 to rotate clockwise, as shown in FIG. 21, to the horizontal position.

As the mixing head 28 moves to the horizontal position, the hook-shaped member 62, having a bevel 62a at its upper end, enters the latch hole 60d, causing the latch release plate 60 to move to the left, as shown in FIG. 23, allowing the upper end of the hook-shaped member 62 to engage the latch portion 60c so that it retains the mixing head 28 in the downward position.

The above described mechanism, including the hold down latch and the head support lever are both actuated by the latch release plate 60, providing a simple and effective means of releasing and positioning the mixing head 28 in the desired operative or retracted position. The mechanism includes a minimum number of parts and the manual actuator is positioned in a convenient location where it may be engaged by the thumb or finger at the same time the hand is gripping the mixing head 28 to reposition it.

What is claimed as new and desired to be secured by Letters Patent of the U.S. is:

1. A food mixing appliance of the type having two pairs of motor driven spindles, each pair being formed to receive detachably a pair of mixing implements, said spindles including a first pair of spindles driven by a motor through a gear train to rotate at a relatively slow rate of speed, a second pair of spindles adjacent said first pair of spindles and driven by said motor through said gear train to rotate at a relatively fast rate of speed, said mixing implements when received in said spindles extending vertically through said spindles and including retaining portions exposed above said spindles, the improvement comprising an implement retainer mounted for sliding movement in a horizontal plane, actuator means for exerting a force against said retainer in a first horizontal direction against a biasing spring means, said implement retainer being mounted for horizontal movement transverse to said first direction, said retainer having four implement latch portions positioned for simultaneous engagement with said implements in either said first or second pair of spindles to retain said implements against detachment from said spindles.

2. The combination of claim 1 wherein said implement latch portions include cam surfaces which are engaged by the insertion of one of said implements into engagement with said spindles to deflect said retainer in said first direction, said implements each having upper ends formed with enlarged portions providing downwardly facing annular shoulders which engage said latch portions to prevent downward movement and disengagement of said implements from said spindles.

3. The combination of claim 1 wherein said implements have upper ends which engage said latch portions of said retainer upon upward insertion of said implements into said spindles and which deflect said retainer in said first direction against said biasing means, said implements having recesses formed downwardly from said upper ends to receive said latch portions, said biasing means forcing said retainer and said latch portions into engagement with said recesses to retain said implements assembled to said spindles.

4. The combination of claim 3 wherein said retainer is mounted for limited rotation in said horizontal plane, said rotation of said retainer permitting retention of one of the implements of a pair while the other implement of such pair is inserted into assembled engagement with a spindle.

5. The combination of claim 4 including a horizontally disposed plate which supports said retainer for limited sliding and rotational movement, cooperating guide means on said plate and said retainer to secure said retainer to said plate and limit said retainer to movement in the horizontal plane and to limit its movement in said first direction.

6. The combination of claim 1 wherein said retainer is an integrally molded plastic part including a pair of S-shaped projections which comprise said biasing spring means, each said projection applying a biasing force horizontally in a vertical plane defined by the axis of rotation of said first or second pair of spindles.

7. A beater retainer mechanism for a multispindle food mixer comprising a bearing plate positioned horizontally above reduction gearing and beater receiving spindles in a food mixer, said spindles having vertical axes about which they rotate and having vertically extending bores which detachably receive beaters, said plate being formed with openings aligned with said spindles through which the upper ends of said beaters extend when assembled to said spindles, a one-piece integrally formed beater retainer supported on the upper surface of said plate for movement in a horizontal plane, complementary projections and slots on said plate and retainer to guide said retainer for sliding and limited rotational movement, complementary engaging portions on said retainer and the upper ends of said beaters, biasing means urging said retainer into engagement with said upper ends of said beaters to retain said beaters assembled to said spindles.

8. The combination of claim 7 wherein said biasing means comprises a first spring operating between said plate and said retainer exerting its force horizontally in a vertical plane including the axes of a first pair of said spindles and a second spring operating between said plate and said retainer exerting its force horizontally in a vertical plane parallel to and spaced from said first mentioned vertical plane and defined by the axes of a second pair of said spindles.

9. The combination of claim 8 wherein said first and second springs are formed integrally with said retainer and are resilient and S-shaped in form.

10. In a food mixer of the type having a head including drive means and a pair of food mixing implements and a stand including a base and an upstanding column on which said head is detachably supported, the improvement comprising a generally horizontal cylindrical axle which is supported on its opposite ends by said column and includes an exposed bearing portion intermediate said ends, head support means including two spaced wall portions extending downwardly from said head, said wall portions being spaced apart a distance equal to the diameter of said axle, said head support including a pair of journal portions being spaced apart and interconnecting said wall portions, said journal portions each defining a downwardly facing semicircular recess and each recess having an axis, the axis of each journal portion recess being coincide-nt, said journal portions being in bearing engagement with the opposite ends of said bearing portion of said axle, said axle being cylindrical with a chordal segment cutaway between said journal portions, said support means having a curved retaining wall extending from one of said wall portions toward the other wall portion, said retaining wall extending between said journal portions and being spaced from said other wall a distance equal to the thickness of said axle at said cutaway.

11. The combination of claim 10 wherein said spaced wall portions are parallel to each other, said curved retaining wall being a segment of a cylinder in shape and having an axis which is coaxial with said axis of said journal portion recesses.

12. The combination of claim 10 wherein said head is elongated with a first end being detachably supported on said column by said axle and said head support means positioned to permit pivotal movement of said head about said one end from a first generally horizontal position to a second position in which said head extends upwardly at an acute angle to the horizontal in order to elevate said food mixing implements out of a food containing vessel, means to retain said head in said first and second positions, said head being pivotal about said axle to a third position in which said retaining wall registers with said cutaway in said axle to permit disengagement of said head from said columns.

13. A food mixing appliance having an elongated mixing head which is supported at one end on a stand and is provided with rotatable spindles at the other end for receiving and driving a plurality of food mixing implements, said stand including a base with a column extending upwardly therefrom and having an upper end to which said one end of said mixing head is pivotally connected for movement through a limited angle in order to move said implements from an operative position in which said implements are disposed vertically to a withdrawn position in which said implements are elevated above said operative position, the improvement comprising a latch mechanism to retain said mixing head in said operative or withdrawn position including a latch release plate mounted in said mixing head between said one end and said other end for sliding movement transversely of the length of said elongated mixing head, a latch member mounted on said column upper end for engagement with said plate to lock said mixing head in said operative position, biasing means urging said plate into engagement with said latch member, manually operable release means on said plate to slide said plate against said biasing means to disengage said latch member from said plate, a head support lever mounted on said mixing head for pivotal movement between a retracted position and an engaged position in which it retains said mixing head in said withdrawn position, said latch release plate being positioned to rotate said lever to said retracted position when said plate is caused to slide in opposition to said biasing means.

14. The combination of claim 13 wherein said mixing head includes a frame supporting a drive mechanism and said spindles which are enclosed within a housing, said latch release plate being mounted for rectilinear sliding movement on said frame within said housing, said manually operable release means extending through an opening in said housing, said head support lever being rotatable by gravity from said retracted position to said engaged position when said mixing head is moved from said operative position to said withdrawn position.

15. The combination of claim 14 wherein said latch member comprises a hook-shaped member which projects upwardly from said upper end of said column and which enters into locking engagement with said plate when said mixing head is moved to said operative position.

16. The combination of claim 14 wherein said frame is formed with guide means which receive said latch release plate and support said plate for rectilinear movement with respect to said frame, said latch release plate being an integrally molded plastic part having said manually operable release means formed integrally therewith, said biasing means including at least one flexible projection molded integrally with said plate and extending into engagement with said frame.

17. The combination of claim 13 wherein said head support lever comprises two parallel spaced support sectors which are interconnected by a bar, said bar being journaled in said mixing head for rotation about an axis which is parallel to and spaced from the axis about which said mixing head pivots with respect to said stand, said lever being gravity actuated to rotate to said engaged position in which said sectors engage said upper end of said column.

18. The combination of claim 17 wherein said plate and said bar of said support lever include interengaging cam means whereby sliding movement of said plate against said biasing means rotates said support lever from said engaged position to said retracted position.

19. A food preparation appliance comprising a power unit having an upright column portion and a vessel support which extends laterally of said upright column portion, said mixing head being elongated and having means at one end for pivotally connecting said mixing head to said upright column portion and having downwardly extending mixing implements at the other end thereof, said mixing implements being detachably supported for rotation about vertical axes by spindles driven by a gear train in said mixing head, said power unit having means coupling to said gear train to drive said spindles, said gear train and spindles being supported by a die cast frame which also supports a latch release plate for sliding movement transverse to the length of said mixing head and midway between said one end and said other end, a latch member extending upwardly from said power unit for engagement with said plate to lock said mixing head in an operative position with said mixing implements positioned vertically and said power unit coupled to said gear train, said latch release plate being manually slidable out of engagement with said latch member to rotate said mixing head to a withdrawn position in which said beaters are elevated from said operative position and said gear train is uncoupled from said power unit.

20. The combination of claim 19 including a mixing head support lever which is pivotally mounted on said mixing head for rotation about an axis which is parallel to and spaced from the axis about which said mixing head is pivotally connected to said power unit, said support lever being movable between an engaged position in which it supports said mixing head in said withdrawn position and a disengaged position in which said mixing head moves to said operative position, cam means on said support lever and said latch release plate which rotates said lever to said disengaged position when said latch release plate is moved in a direction for disengagement from said latch member.

21. The combination of claim 20 wherein said support lever comprises a pair of parallel, spaced support sectors which are interconnected by a bar, said bar being journaled for rotation in said mixing head, biasing means urging said latch release plate in a direction into engagement with said latch member, said support lever being rotatable by gravity to said engaged position, a cam formed on said bar being engageable by a projection on said latch release plate to rotate said support lever to said disengaged position.

* * * * *

UNITED STATES PATENT AND TRADEMARK OFFICE
CERTIFICATE OF CORRECTION

PATENT NO. : 5,000,578

DATED : March 19, 1991

INVENTOR(S) : ROBERT L. ARTIN ET AL.

It is certified that error appears in the above-identified patent and that said Letters Patent is hereby corrected as shown below:

Column 9, line 62, --stop members 70d engage projections on the cover portion-- should be inserted after "The".

Signed and Sealed this

Twenty-eighth Day of September, 1993

Attest:

*Attesting Officer*

BRUCE LEHMAN

*Commissioner of Patents and Trademarks*